United States Patent [19]

Pankuch

[11] 4,022,697

[45] May 10, 1977

[54] SEALED SEDIMENTATION DEVICE

[75] Inventor: Peter Jerome Pankuch, Bountiful, Utah

[73] Assignee: Envirotech Corporation, Menlo Park, Calif.

[22] Filed: Mar. 6, 1975

[21] Appl. No.: 556,046

[52] U.S. Cl. .................................. 210/530; 48/176; 220/217

[51] Int. Cl.[2] .......................................... B01D 21/14

[58] Field of Search ..... 210/525, 528, 530, DIG. 9; 61/.5, 1 R; 48/176; 220/228, 217

[56] References Cited

UNITED STATES PATENTS

| | | | |
|---|---|---|---|
| 2,132,837 | 10/1938 | Talbot | 210/DIG. 9 |
| 2,546,572 | 3/1951 | Wiggins | 220/217 X |
| 2,566,988 | 9/1951 | Kolb | 210/530 X |
| 2,627,978 | 2/1953 | Curtis | 210/530 |

*Primary Examiner*—Frank A. Spear, Jr.

*Assistant Examiner*—Robert H. Spitzer

*Attorney, Agent, or Firm*—Robert E. Krebs; William S. Bernheim; Thomas S. MacDonald

[57] ABSTRACT

An apparatus for separating solids from liquids by sedimentation includes a covered tank in which a sediment-engaging raking structure is journaled for rotation about a central support pier. The raking structure is driven by a unit which travels about the periphery of the tank outside the enclosure. A gas-tight seal is effected between the tank, the cover and the drive unit by the combination of an annular liquid-holding launder which is fixedly supported to surround the interior of the tank, a rigid U-shaped member which connects the drive unit to the raking structure with its lower portion submerged in the liquid held in the launder, and a continuous baffle-like wall extending from the tank cover downwardly into the space bounded by the submerged portion of the U-shaped member.

8 Claims, 3 Drawing Figures

SEALED SEDIMENTATION DEVICE

BACKGROUND OF THE INVENTION

Field of the Invention

This invention generally relates to the separation of solids from liquid by sedimentation.

State of the Art

Many industrial processes utilize gravity-type sedimentation equipment to separate suspended solids from liquids. A typical gravity-type sedimentation unit or "thickener" includes a large liquid-holding tank equipped with a raking structure which rotates slowly about a central support column to move the settled solids to a discharge sump formed in the bottom of the tank. The raking structures are usually driven either by a gear mechanism mounted on the central pier (center drive type) or by a tractor-like unit which travels about the periphery of the tank (peripheral or traction drive type). It is sometimes necessary to sealingly cover the thickening tanks to contain noxious and corrosive gases such as, for example, ammonia or nitric acid fumes which are harmful to personnel and equipment. The sealing of a center drive type device is relatively simple because the cover can be fixed to the tank sidewall and need only include apertures through which the various supply and discharge conduits extend from the center column. However, the housing of a traction type thickener is more difficult because of the need to accomodate the drive unit which travels about the periphery of the tank. One prior housing for that type of device was simply a building constructed over the entire thickener. However, such buildings are expensive and wasteful of space and, if noxious fumes are present, access to the drive mechanism is difficult because of the need to purify the air prior to entry by maintenance personnel.

An object of the invention described hereinafter is the provision of a novel structural arrangement for sealing a sedimentation device of the peripheral drive type in order to contain fumes and vapors while enabling the use of a drive unit located outside the housing which drivingly rotates a raking structure in the settling tank enclosed within the housing.

BRIEF DESCRIPTION OF THE DRAWINGS

Further objects and advantages of the present invention may be readily ascertained by reference to the following description and appended drawings which are offered by way of illustration only and not in limitation of the invention, whose scope is defined by the appended claims and equivalents to the structure, materials and acts recited therein.

In the drawings incorporated herewith.

DETAILED DESCRIPTION OF THE PREFERRED EMBODIMENT

Figure 1:
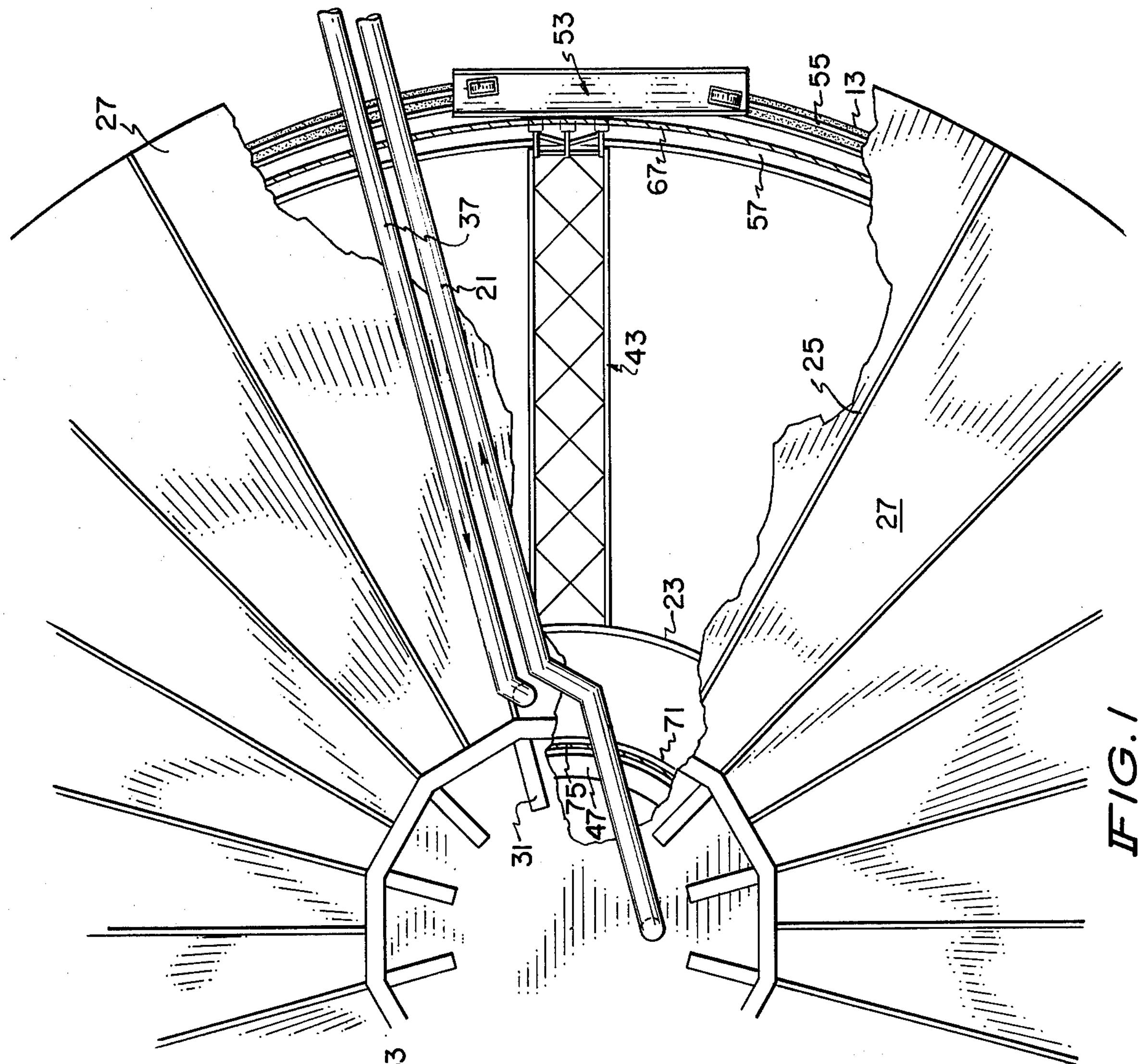
FIG. 1 is a plan view, partially cut away, of a portion of a circular sedimentation device incorporating the present invention.

The sedimentation device as shown in the drawings includes a circular settling tank defined by a continuous marginal sidewall 13 and a generally circular bottom 15 which slopes inwardly downward toward a central sludge sump 17. The liquid level within the settling tank is established by a marginal weir 18 that is supported on a continuous ledge 16 that extends inwardly from the tank sidewall 13 to define an annular trough 19 into which clarified effluent spills for discharge via an effluent conduit, not shown. The aforementioned sludge sump 17 encircles the base of a stationary, generally cylindrical pier 20 which stands upright at the center of the tank. A conduit 21 is in liquid flow communication with the sump 17 and extends upwardly through the center pier 20 for withdrawing settled sludge from the tank. Influent liquid is continuously introduced into the settling tank via an annular feedwell 23 that is supported to gird the center pier 20. The influent liquid is gently dispersed radially outward through openings in the feedwell 23 into the liquid body in the settling tank.

Above the tank, a stationary superstructure 25 supports a non-foraminous roof 27 which covers the tank in sealing relationship thereto as will be described hereinafter in detail. Outside the periphery of the tank, the superstructure 25 is supported by spaced-apart trusses 29. In the illustrated embodiment, the trusses extend upwardly and outwardly thereby defining a cross-sectionally triangular space in conjunction with the tank sidewall 13. Preferably, the roof superstructure 25 is also supported near its center by a plurality of spaced-apart vertical members or columns 31 which extend from the center pier 20. It should be understood, however, that a superstructure could be designed to extend over the entire tank without support from the center pier 20.

To carry influent liquid into the aforementioned feedwell 23 and thence into the settling tank, a conduit 37 is supported across the roof 27 and has a downcomer 28 that sealingly extends through the roof 27 with its discharge end positioned to admit influent liquid into the feedwell 23.

Figure 2:
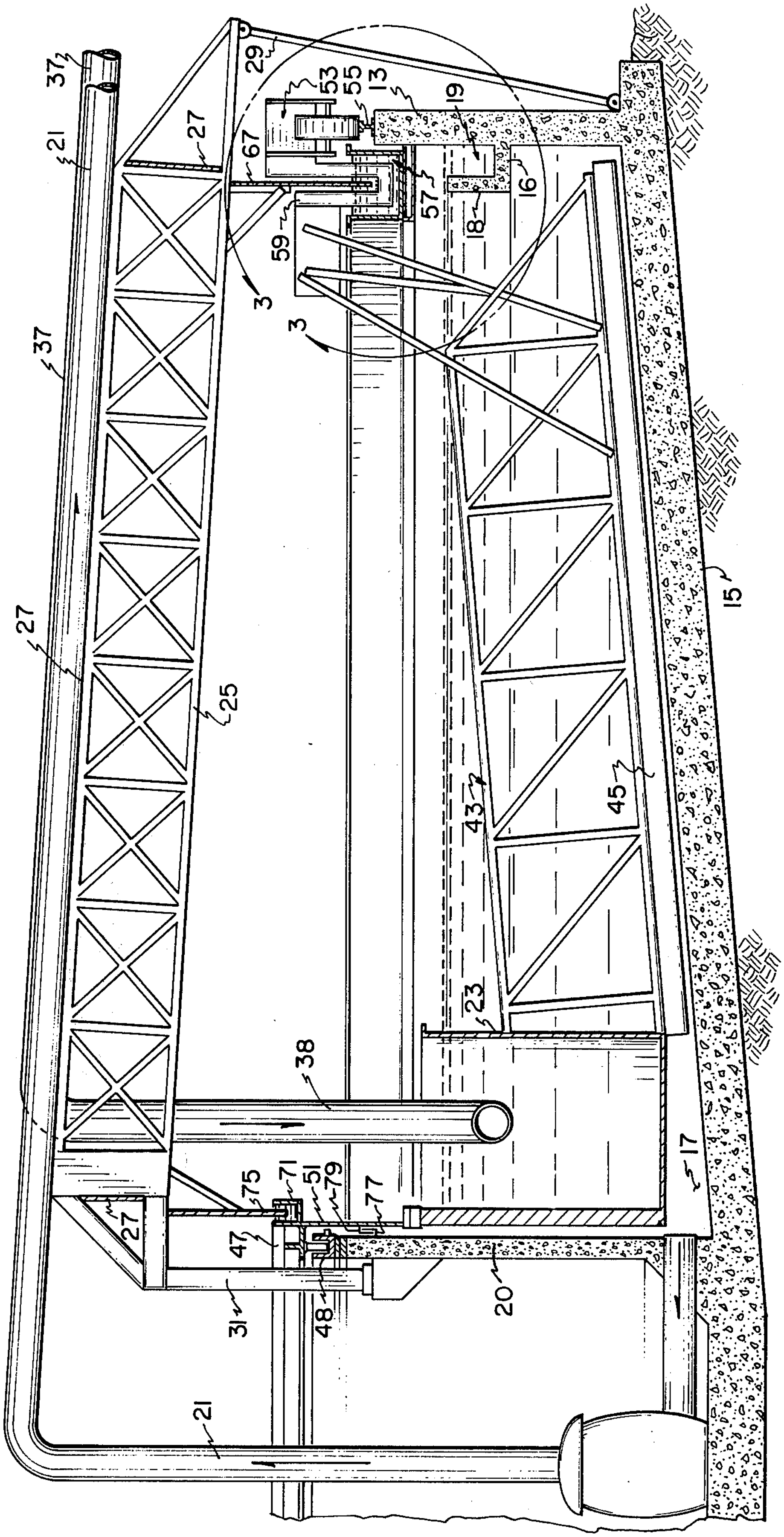
FIG. 2 is an elevational view in section of the sedimentation device of FIG. 1.

FIG. 2 also shows the raking structure, designated 43 and generally of conventional design, which extends radially from the center pier 20 and which is journaled to rotate to slowly sweep across the tank bottom 15 thereby to engage and thicken the sediment and to urge the same towards the discharge sump 17. The illustrated raking structure 43 comprises a rigid trusswork which supports raking blades 45. Generally speaking, the rake trusswork is supported by a horizontally-disposed rotary hub 47 which is arranged to rotate on a ring-like bearing race 48 that is mounted on the top of the pier 20 above the liquid level and positioned to surround the superstructure support columns 31. More specifically, a circular cage 51 is suspended for rotation from the hub 47 and fixedly supports the feedwell 23 as well as the raking structure 43, both of which rotate with the cage. One or more such raking structures could be provided in the thickening unit. The outer end of the raking structure 43 is coupled to a drive tractor 53, not shown in its entirety, which travels about the periphery of the tank on rails 55 which are mounted on the top edge of the tank sidewall 13 inwardly of the support trusses 29. Typically, the tractor is powered electrically but it could be energized otherwise.

Figure 3:
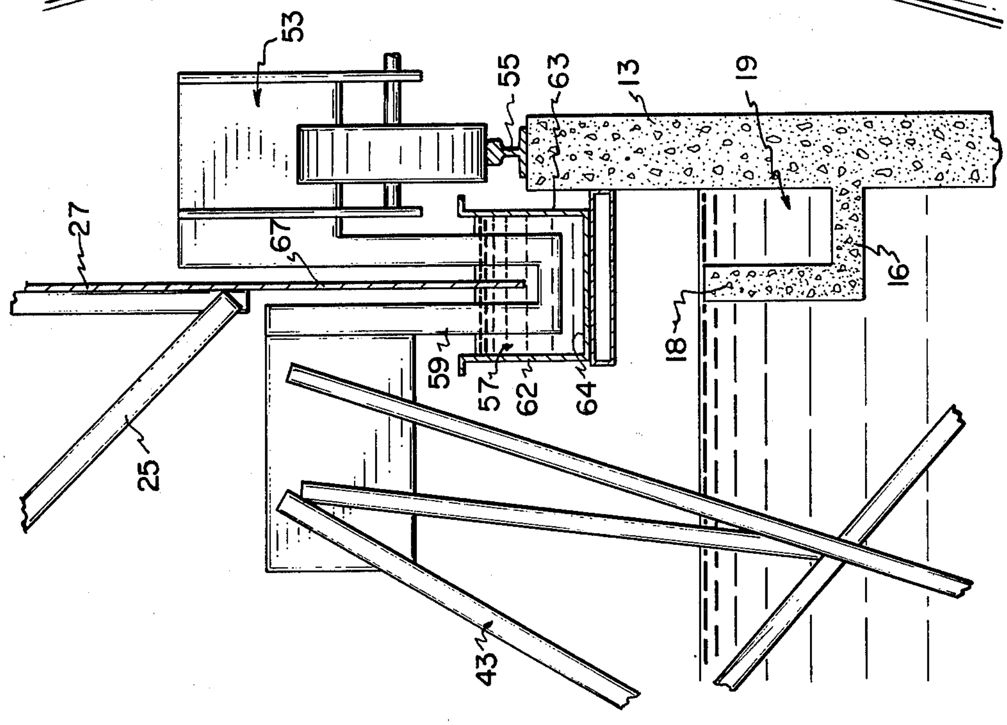
FIG. 3 is an enlarged detail in elevation of the structure encircled by the arrow 3—3 in FIG. 2.

FIG. 3 shows in more detail the manner in which the raking structure 43 is coupled to the drive tractor 53 while permitting a sealed relationship between the roof 27 and the tank sidewall 13. As illustrated, an annular liquid-holding seal launder 57 defined by continuous parallel upstanding sidewalls 62 and 63 and a bottom wall 64 is fixedly supported from the tank sidewall 13 to surround the interior of the tank above the liquid level therein. A rigid U-shaped member 59 fixedly connects the drive tractor to the raking structure and is arranged to travel through the seal launder 57 with its lower portion submerged in the liquid held in the launder. A continuous baffle-like sealing wall 67 is supported from the roof superstructure 25 to depend downwardly into the space bounded by the submerged portion of the U-shaped member 59 so as to form a gas-tight liquid seal with respect to the launder 57 and, hence, with respect to the tank proper.

If an opening is formed in the roof 27 above the center pier, to permit outside access to the bearings carried by the column for example, a similar but somewhat simpler sealing arrangement can be provided. As shown in FIG. 2, an annular trough 71 is fixed to the periphery of the rotary hub 47 to rotate therewith above the liquid level in the tank. A continuous circular baffle plate 75 sealingly depends from the roof superstructure 25 to form a gas-tight seal with the liquid held in the trough 71. A second annular trough 77 is fixedly supported from the center pier 20 at a location below the rotary hub 47. A second circular baffle plate 79 is fixedly suspended and carried by the rotary hub 47 inwardly of the cage 51 in sealed relationship to the first annual trough 71 to extend into the second trough 77 to form a gas-tight seal therewith. The two sealing structures (comprising trough 71 with associated baffle 75, and trough 77 with associated baffle 79) complete the gas-tight seal about the center pier.

Various advantages of the previously described device can now be readily understood. Among those advantages are accessibility of the drive unit 53 and support rails 55 for maintenance. Furthermore, the drive unit is isolated from any corrosive environment caused by fumes from the tank contents. The aforedescribed arrangement may be contrasted with another prior and more complicated sealing arrangement for peripheral drive type sedimentation units wherein trusses were provided above the roof superstructure to connect the drive tractor to the center cage to provide driving torque without violating the sealed tank requirement.

I claim:

1. In an apparatus for separating solids from liquids by sedimentation, which apparatus includes a liquid-holding tank, means for maintaining a predetermined maximum liquid level in the tank, a support pier which stands centrally in the tank, a sediment-engaging raking structure supportively journaled to rotate about the pier, a stationary roof supported outside the periphery of the tank, and drive means which travel about the periphery of the tank to rotatably drive the raking structure, the improvement comprising:

a. an annular liquid-holding seal launder fixedly supported inward of the path of travel of said drive unit to surround the interior of the tank and to surround the means for maintaining a maximum liquid level in the tank;

b. a rigid U-shaped member fixedly connecting the drive means to the raking structure and arranged to travel continuously through the seal launder with its lower portion submerged in the liquid held in the launder; and c. a continuous baffle-like wall supported by said roof to depend downwardly into the space bound by the submerged portion of said U-shaped member thereby to form a gas-tight seal between the roof and the tank to enable the drive means to travel outside the sealed enclosure.

2. The improvement according to claim 1 wherein the annular liquid-holding seal launder is above the predetermined maximum liquid level in the interior of the tank.

3. The improvement according to claim 2 wherein the liquid level in the tank is established with a marginal weir.

4. In an apparatus for separating solids from liquids by sedimentation, which apparatus includes a liquid-holding tank, means for maintaining a predetermined maximum liquid level in the tank, a support pier which stands centrally in the tank, a sediment-engaging raking structure supportively journaled to rotate about the pier, a stationary roof supported outside the periphery of the tank to cover the same and having an opening formed therein above the pier, and drive means which travel about the periphery of the tank to rotatably drive the raking structure, the improvement comprising:

a. an annular liquid-holding seal launder fixedly supported by the tank sidewall to surround the interior of the tank;

b. a rigid U-shaped member fixedly connecting the drive means to the raking structure and arranged to travel continuously through the seal launder with its lower portion submerged in the liquid held in the launder;

c. a continuous baffle-like wall supported by said roof to depend downwardly into the space bounded by the submerged portion of said U-shaped member to form a gas-tight seal with said launder;

d. a first annular trough carried by said rotatable raking structure to rotate therewith and arranged to surround the center pier above the liquid level in the tank;

e. a first circular baffle plate which depends from the roof to form a liquid seal with respect to liquid held in said first trough;

f. a second annular trough fixedly supported from the center pier; and g. a second circular baffle plate fixedly suspended and carried by said raking structure in sealed relationship to said first annular trough to extend into said second trough to form a gas-tight seal between the roof and the tank to enable the drive means to travel outside the sealed enclosure.

5. The improvement according to claim 2 wherein the annular liquid-holding seal launder is above the predetermined maximum liquid level in the interior of the tank.

6. The improvement according to claim 5 wherein the liquid level in the tank is established with a marginal weir.

7. An apparatus for separating solids from liquids by sedimentation comprising a liquid-holding tank, means for maintaining a predetermined maximum liquid level in the tank, a support pier which stands centrally in the tank, a sediment-engaging raking structure supportively journaled to rotate about the pier, a stationary roof supported outside the periphery of the tank, a drive means which travels about the periphery of the tank to rotatably drive the raking structure, an annular liquid-holding seal launder fixedly supported by the tank sidewall to surround the interior of the tank, a rigid U-shaped member fixedly connecting the drive means to the raking structure and arranged to travel continuously through the seal launder with its lower portion submerged in the liquid held in the launder; and a continuous baffle-like wall supported by said roof to depend downwardly into the space bounded by the submerged portion of the said U-shaped member, thereby to form a gas-tight seal between the roof and the tank to enable the drive means to travel outside the sealed enclosure.

8. The apparatus of claim 7 wherein the liquid level in the tank is established with a marginal weir.

* * * * *